(12) United States Patent
Persson et al.

(10) Patent No.: US 7,085,615 B2
(45) Date of Patent: Aug. 1, 2006

(54) DYNAMIC ON-LINE OPTIMIZATION OF PRODUCTION PROCESSES

(75) Inventors: Ulf Persson, Örsundbro (SE); Tomas Lindberg, Västerås (SE); Lars Ledung, Västerås (SE); Per-Olof Sahlin, Göteborg (SE); Lennart Kållén, Forshaga (SE)

(73) Assignee: ABB AB, Västerås (SE)

( * ) Notice: Subject to any disclaimer, the term of this patent is extended or adjusted under 35 U.S.C. 154(b) by 146 days.

(21) Appl. No.: 10/487,099

(22) PCT Filed: Jun. 12, 2003

(86) PCT No.: PCT/SE03/00991

§ 371 (c)(1),
(2), (4) Date: Aug. 13, 2004

(87) PCT Pub. No.: WO03/107103

PCT Pub. Date: Dec. 24, 2003

(65) Prior Publication Data

US 2004/0260421 A1    Dec. 23, 2004

(30) Foreign Application Priority Data

Jun. 12, 2002   (SE)   .................... 0201812

(51) Int. Cl.
*G06F 19/00*   (2006.01)

(52) U.S. Cl. ..................... 700/108; 700/128

(58) Field of Classification Search ........ 700/108–111, 700/122, 127–129, 173, 174

See application file for complete search history.

(56) References Cited

U.S. PATENT DOCUMENTS 5,659,667 A  *  8/1997  Buescher et al. ............. 706/23

(Continued)

FOREIGN PATENT DOCUMENTS

EP    1035253 A1    9/2000

(Continued)

OTHER PUBLICATIONS

Philip A. Wisnewski and Francis J. Doyle, III; "Model-Based Predictive Control Studies for a Continuous Pulp Digester"; Transactions on Control Systems Technology; May 2001, pp. 435-444; vol. 9, No. 3.

*Primary Examiner*—Maria N. Von Buhr
(74) *Attorney, Agent, or Firm*—Venable LLP; Eric J. Franklin

(57) ABSTRACT

A process is modeled by a dynamic model, handling time dependent relations between manipulated variables of different process sections (10A–D) and measured process output variables. Suggested input trajectories for manipulated variables for a subsequent time period are obtained by optimizing an objective function over a prediction time period, under constraints imposed by the dynamic process model and/or preferably a production plan for the same period. The objective function comprises relations involving predictions of controlled process output variables as a function of time using the process model, based on the present measurements, preferably by a state estimation procedure. By the use of a prediction horizon, also planned future operational changes can be prepared for, reducing any induced fluctuations. In pulp and paper processes, process output variables associated with chemical additives can be used, adapting the optimization to handle chemical additives aspects.

48 Claims, 6 Drawing Sheets

U.S. PATENT DOCUMENTS

| | | |
|---|---|---|
| 5,825,653 A | 10/1998 | Huovila et al. |
| 5,933,345 A | 8/1999 | Martin et al. |
| 6,055,483 A | 4/2000 | Lu |
| 6,122,555 A | 9/2000 | Lu |
| 6,319,362 B1 | 11/2001 | Huhtelin et al. |
| 6,328,851 B1 | 12/2001 | Huhtelin et al. |
| 6,347,254 B1 * | 2/2002 | Lu .............................. 700/29 |
| 6,453,308 B1 * | 9/2002 | Zhao et al. ................... 706/21 |
| 6,577,916 B1 | 6/2003 | Gehr et al. |
| 6,826,521 B1 * | 11/2004 | Hess et al. ..................... 703/12 |
| 6,901,300 B1 * | 5/2005 | Blevins et al. ................ 700/46 |
| 6,993,408 B1 * | 1/2006 | Puurtinen ................... 700/128 |
| 2002/0060017 A1 * | 5/2002 | Kuusisto et al. ............ 162/198 |

FOREIGN PATENT DOCUMENTS

| | | |
|---|---|---|
| EP | 1188860 A2 | 3/2002 |

* cited by examiner

DYNAMIC ON-LINE OPTIMIZATION OF PRODUCTION PROCESSES

TECHNICAL FIELD

The present invention relates generally to a method and a system for production processes and in particular to optimization of process operation conditions. The present invention is particularly well suited for pulp and/or paper production processes.

BACKGROUND

In manufacturing of pulp and paper, the production is typically divided in a number of process sections connected to each other in a more or less complex pattern. Examples of process sections could be digesters, washing arrangements, refiners, bleaching arrangements, etc. The part process of each process section is typically a complex process, where the output flow from the process section and its properties depends on the present input flow (including its properties) of material, chemical additives, process operational conditions as well as of the previous history of operation of the process section. This means that the output is not only dependent on present conditions, but also on how the process section was operated in an earlier stage, i.e. there is a dynamic relation between variables of different kinds.

In pulp and paper production, a lot of chemical substances are added during the process. These process chemicals normally react and form other chemical substances when performing their intended action upon the pulp and/or paper. However, some chemical substances are to a large extent extracted from the process, to keep the concentrations within required limits. Since the chemical substances are expensive, as much as possible is collected and recovered. A pulp and paper production line therefore typically comprises also process sections taking care of extracted chemical substances. The flow and properties of such chemical substances through the process are connected to operational conditions in an even more complex manner. In particular, the dependence on process history is even more pronounced than for the pulp flow itself. In most pulp and paper mills of today, control of the flow of chemical additives is typically of a very simple type. If a shortage of chemicals appears, more chemicals are added, if an excess of chemicals appears, the excess is wasted.

In the European Patent Application EP 1 035 253, an on-line optimized pulp or paper production process is disclosed. In this disclosure, a number of inputs, such as raw material as well as chemicals, energy etc. are mentioned as important to optimize the process. The outputs, which are considered, are typically production quantity, quality properties, and price as well as waste product quantities. However, the actual optimizing procedure is only described in general terms as an automatically calibrating module. The method is probably intended for off-line optimization of set-points in different typical steady-state situations. Difficulties arising from differences in the previous history of operation are not addressed at all. Furthermore, the optimization basically concerns the process as one entity, where only inputs and outputs of the entire process are discussed, even if bottleneck problems are mentioned.

Problems arising from dependence of operation history becomes particularly accentuated when the operation of the process is changed, e.g. if the production rate is changed. Also large variations in the properties of the raw material, e.g. large kappa number changes or a change between hardwood and softwood, may cause large changes to the process. In such cases, large and slow fluctuations may be induced in the process system. Some fluctuations may even have time constants exceeding several hours. Models and optimization procedures, which are focused in the present outcome of the process, may therefore introduce control measures, which much later may turn out to be unfavourable. In cases where the changes in process operation are large and/or abrupt, it may not even be possible to maintain required quality, and operate the mill close to the most profitable state. Fluctuations are generally connected with actions, which eventually end up with increased waste of e.g. chemical additives, which in turn is connected to large costs. These fluctuations are difficult to handle in prior art control systems.

Control systems according to prior art are typically based on an assumption of a substantially failure-free operation. In case a failure occurs and a process section temporarily has to be taken out of operation, there might not be enough buffers ensuring a continuous operation for the rest of the process sections. Such discontinuities may affect both the quality and the quantity of the end product as well as other cost related properties. In particular in systems having pronounced bottlenecks, problems with continuity may occur during minor disruptions.

SUMMARY

A problem with prior art control methods is that they typically are not suited for handling process operation variations having relatively large time constants. Another problem with prior art systems is that there is a fairly large sensitivity even to minor failures of process sections. Furthermore prior art systems typically have an unsatisfactory treatment of bottleneck processes.

An object of the present invention is thus to provide a system and method, in particular for pulp and paper production, being capable of handling systems having dynamic processes with relatively large time constants. A further object of the present invention is to provide a system and method, in particular for pulp and paper production that can optimize the utilization of chemical additives in the process. Another object is to provide a system and method offering a flexible possibility to handle bottleneck problems.

The above objects are achieved by methods and systems according to the enclosed patent claims. In general words, a process is modeled by a dynamic model, handling time dependent relations between manipulated variables of different process sections and the process output variables of respective process section. A number of state variables are measured, and previous measurements are preferably also available. Suggested input trajectories for manipulated variables for a subsequent time period are obtained by optimizing an objective function over a prediction time period, under constraints imposed by the dynamic process model and preferably a production plan for the same period. The objective function comprises relations involving predictions of controlled process output variables as a function of time for the prediction time period using the process model, based on the present and preferably also previous measurements of state variables. In such a manner, dynamic behaviors of the process are handled. By the use of a prediction horizon, also planned future operational changes can be prepared for, reducing any induced fluctuations.

The dynamic model is preferably based on dynamic section models, modeling the actual process of the different process sections, interconnected by intermediate storage models, such as buffer models or buffer tank models. Flows between the different sections are process output variables or manipulated variables. By using process output variables associated with chemical additives, and in particular the amount of chemicals, the distribution of chemicals over the system and the consumption of chemicals, the optimisation can be adapted to handle opting aspects concerning chemical additives. Furthermore, other optimization aspects such as handling of bottleneck processes and minor failures in exposed process sections are also treated. State estimation techniques are preferably used for pre-treatment of the actually measured variables to be able to generate an initial state for the future optimization.

The method and the system according to the invention may be used to carry out on a production process, preferably a pulp and/or paper production process, any of the operations of: monitoring, controlling, regulating, simulating, optimising, providing support for decisions, advising.

BRIEF DESCRIPTION OF THE DRAWINGS

The invention, together with further objects and advantages thereof, may best be understood by making reference to the following description taken together with the accompanying drawings, in which.

DETAILED DESCRIPTION

Figure 1:
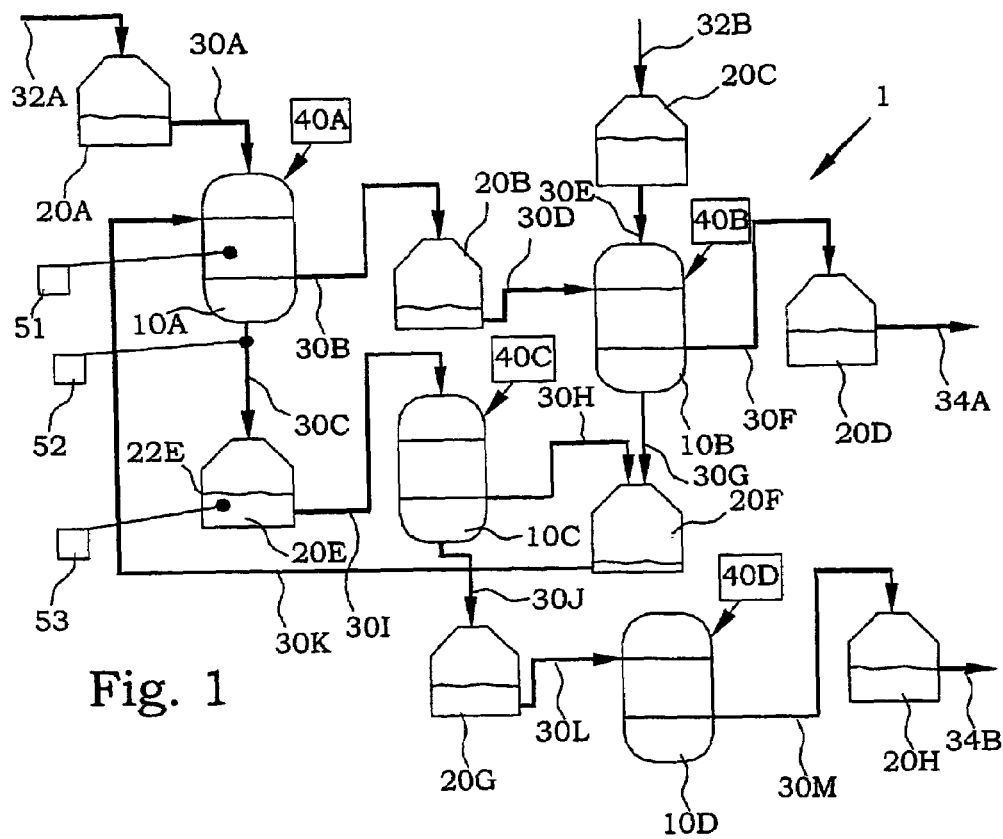
FIG. 1 is a block diagram illustrating a model of a part of a process system.

In the present invention disclosure, a number of variables connected to the process will be discussed. These variables have somewhat differing character, and to avoid any misinterpretation of the terminology, definitions of the terms used throughout the present disclosure is first presented.

A process is at every time characterized by a number of state variables. Such state variables can in a general view be of almost any kind and is here used as a common term for all possible variables concerning the state of a process.

A process or a section thereof is typically controlled by setting a number of manipulated variables. Such manipulated variables are state variables that are easy to influence and that have a significant relevance for the operation of the process. Such manipulated variables can e.g. be the input flow of material or additives into a process, easily regulated by controlling e.g. a valve.

The result of a control action is represented by a set of state variables, in the present disclosure called process output variables. A subset of these process output variables is suitable for monitoring the control action. Such variables are here called controlled process output variables. The purpose of the control action is to bring the controlled process output variables close to pre-determined set-points or set-point functions. State variables characterizing the result of the process control, but not directly used for controlling purposes, are in the present disclosure called associated process output variables.

Some state variables are easy to measure more or less directly by different sensors. Such variables are called measurable variables. Other state variables may be difficult or even impossible to measure in a direct manner. Instead, another related quantity or quantities is(are) measured, and the actual state variable is estimated through more or less complex models or relations. Such variables are called derivable variables.

Many production processes of today are quite complex arrangements of different linked process sections. Cost and environmental considerations call for recycling of waste products, which makes the allover process system even more complex. There is normally not only one straight line of process sections, but the sections are typically connected in loops and by a network of connections.

A typical way to handle flow variations in the interface between different process sections is to introduce buffer tanks. The absolute output flow from a preceding process section does not limit the operation of a subsequent process section, if only the average output flow is sufficient. The exact level of the buffer tank is of minor importance in each moment.

General production processes involve today quite complex operations. The manipulated variables used for performing the actual control of the process section are generally not directly connected to the process output variables, such as e.g. flow and output characteristics by any simple relations. Non-linear relations as well as time dependencies are typically present. This means that a certain change in a manipulated variable performed at different occasions may have different effect on the process output variables. Such non-linear and/or dynamic processes are e.g. present in most pulp and paper production mills of today. Since many of the processes basically are related to non-trivial chemical reactions, different chemical equilibrium relations are for instance involved. Different concentrations of chemical species may drive the process according to different chemical reactions. There might also be a large inertia effect in such processes. An excess of a certain chemical species during one process period may influence the process operation at a later occasion.

From the above discussion, it is obvious that a general pulp and paper production process of today comprises material flows and processes having large time constants for variations. These dynamic properties emanate from the process dynamics itself, but also from the use of buffer storage tanks between process sections. Efforts for supporting such dynamics have to be employed when modeling such systems.

According to a preferred embodiment of the present invention, a model of a complex production process is based on the division into a number of standard model objects. The total model thereby comprises a number of section models, corresponding to the different process sections, a group of process sections or a part of one process section. The section models are connected to each other via model objects, basically representing intermediate storages, here in the form of so called buffer models. FIG. 1 illustrates an example of a model 1 of a process system. This process system portion has four process sections, represented by section models 10A–D. The section models are connected by a number of connections having different flows 30A–M.

Each section model 10A–D has one or more section input flow 30A, D, E, I, K, L of raw material, part products, chemical additives, solvents etc. Each section model 10A–D has also one or more section output flow 30B, C, F, G, H, J, M of section end product, by-products, waste products etc. The section output flows 30B, C, F, G. H, J, M are in turn connected to constitute input flows of buffer models 20A–H. Similarly, the section input flows 30A, D, E, I, K, L starts as output flows from the buffer models 20A–H. In such a way, each section model 10A–D is typically connected to only buffer models 20A–H and buffer models 20A–H are only connected to section models 10A–D. Additionally, there are input flows 32A–B to the entire process and output flows 34A–B from the entire process, which flows are directed to or starting at buffer models 20A–H.

The principle of alternating sections and buffers is a simple and preferred manner to design the total model by a limited number of standard model objects. However, anyone skilled in the art understands that other model designs may be used as well. For instance, the actions of the buffers may be incorporated as a part of a neighboring section model, whereby only interconnected section models are present. The model may also be a mix there between and may include also other types of model objects, having other characteristics.

In the model of FIG. 1, the section models 10A–D and the buffer models 20A–H present different characteristics. A section model 10A–D represents a part process, and includes a more or less complex dynamic relation between the input flows and the output flows, including the properties of the flow substances. This relation has typically a number of manipulated variables 40A–D, by which the actual control of the process is exerted. Such manipulated variables may e.g. control the input flow rates to the process section, or operational conditions such as temperature, pressure, energy supply etc. to the process section. As described above, the relation between input and output flows, and the properties of the substances thereof, is generally a dynamic relation, involving time dependent terms. This means that the process output variables characterizing the operation of the process section generally depends not only on the present settings of the manipulated variables, but also on previous settings of manipulated variables as well as on the actual previous process operation.

The intermediate storage model may be generalized to a few object types. There is an input flow, basically determined by the output flow of one or several section models, or by external factors when considering the total inputs 32A–B. There is an output flow, determined by the input flow of one or several section models, or by external factors when considering the total outputs 34A–B. A buffer level 22A–H or a concentration is thus determined by the time-integrated differences between input and output flow. Basically, the buffers are not possible to control explicitly. In a first simple stage of modeling, the material content in a buffer is considered to be homogeneous, i.e. an immediate and complete mixing is assumed. However, if large variations in substance properties are expected, or if a mixing is believed to be difficult, a more sophisticated model can be created, where time dependent relations between substance properties of input and output flows are employed.

In a process system according to the model illustrated in FIG. 1, there are many process output variables that are of interest for monitoring the operation of the process. A number of different sensors 51, 52, 53 are provided to measure important process output variables. In FIG. 1, only three sensors are illustrated, in order to simplify the drawing. However, sensors are typically present allover the entire system. The sensor 51 may be representative of measurements of state variables e.g. process conditions in the actual process sections. The sensor 52 may be representative of measurements of flow rates and composition and/or concentration of substances in the flow. The sensor 53 may be representative of a buffer level sensor of a buffer tank. More examples of useful process output variables and their utilization are discussed further below.

When creating a model of a complex process, not only the actual operation of the process has to be considered, but also aspects concerning the combined operation of process sections and buffers. In most process systems, there are one or several bottlenecks. Such bottlenecks typically represent process sections with the smallest operational margin as compared with the intended maximum production of the total plant. In FIG. 1, it is assumed that process section 10C represents such a bottleneck. If said section 10C is not operated at or close to its maximum capacity, there is a risk that the material stored in buffer 20F eventually will run out. This in turn means that process section 10A has to be operated at a lower rate, which probably will reduce the overall production capacity. Thus, an efficient operation of the total process should include measures to ensure that the process section 10C is operated at or close to its maximum capacity during substantially all the time. One measure in this direction is to ensure that there is always input material available in buffer 20E. The buffer level 22E of buffer 20E should therefore in a control procedure not be allowed to drop too far under normal operation conditions. Similarly, buffers 20F and 20G, in particular 20G that is dependent only on the process section 10C, have to have available buffer space for storing the output flow from the process section 10C. This means that e.g. the buffer level of buffer 20G preferably should be kept comparably low, if possible.

In many process systems, certain process sections are normally more exposed to operation failures than others. Examples of temporary operation stops or failures could be e.g. need for service of equipment, such as cleaning, replacing consumable parts or minor repairs. By identifying such "weak" process sections, the total production efficiency may be ensured by introducing additional constraints or control goals into the controlling procedure. If in FIG. 1, process section 10B is subjected to intermittent operation failures, e.g. some consumable parts have to be replaced at irregular and unpredictable occasions, the following interesting considerations can for instance be made. Assume that the average out-of-operation time is comparably large and that there is knowledge of the statistical distribution of time to repair and time between failure. If the replacement is performed rather quickly, the operation of the other process sections does not have to be affected, if there is enough material buffered. If the process section 110B should be allowed to have shorter inactivity periods, the buffer levels of buffer 20B and 20C have to be kept generally low to allow for a collection of substances during the inactivity period. Similarly, the buffer level in buffer 20F has to be kept generally high, so that an interruption of the process section 10B does not affect process section 10A. How buffer 20D is affected depends on the further connection of the output flow 34A.

Figure 2:
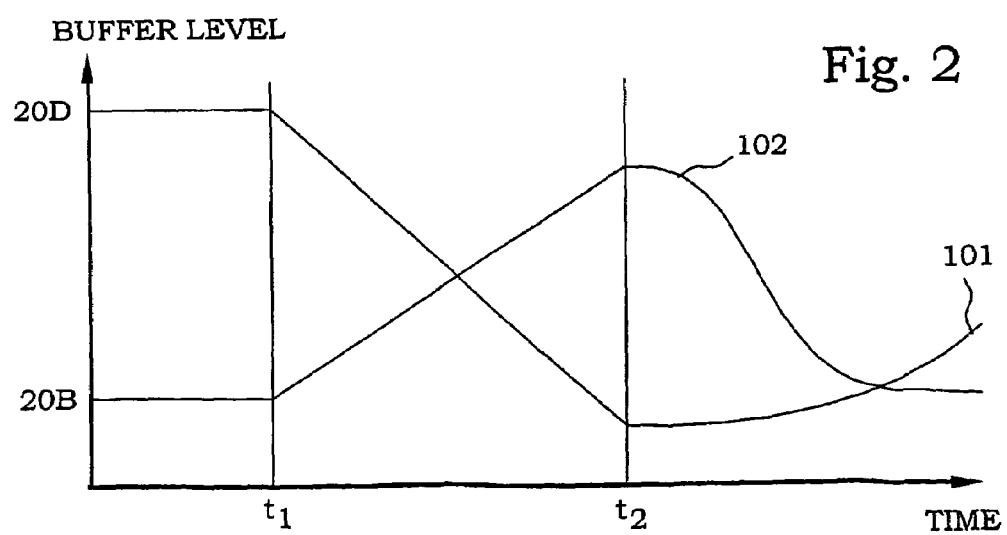
FIG. 2 is a diagram illustrating the effect of a temporarily shut-down of a process section on buffer levels.

FIG. 2 is a diagram illustrating what may happen at an interruption of the process section 10B. It is assumed that the initial operation is in steady state, i.e. such that the buffer levels are kept constant in both buffer 20B and 20D, and that the output flow from the buffer 20D is constant and the input flow to the buffer 20B also is constant. The corresponding buffer levels are illustrated by the curves 102 and 101, respectively. At a time $t_1$, process section 10B is taken out of operation and is put back in operation again at time $t_2$. In the meantime, the input flow to buffer 20B increases the buffer level linearly and the output flow from buffer 20D decreases linearly. If the time interval $t_2$–$t_1$ is short enough, the buffers 20B and 20D will not reach any critical limits. When the process section 10B comes into operation again, the total process is controlled in such a way that the buffer levels of buffer 20B and 20D slowly returns to the requested ideal values. The preferred buffer levels as well as the total buffer volume can thus be optimized by knowledge of the statistical distribution of stop-times of process section 10B.

If both the above scenarios are present at the same time, one realizes that there are demands put on the buffer level in buffer 20F, which go in opposite directions. This calls for a very careful control of the buffer level and/or a large maximum buffer volume.

In chemical pulp and paper processes of today, a number of chemical additives are typically used. The most frequently appearing substances are sodium and sulfur in form of different chemical compounds. Sodium and sulfur thus exist in different appearances during the process, e.g. as sodium sulfide, sodium hydroxide, sodium sulfate, sodium tiosulfate, sodium sulfite, sodium carbonate, sodium oxalate, sulfuric acid, sulfur dioxide, elementary sulfur and organic sulfur compounds. Most of the chemicals in the process are recovered and recirculated into the process. In the different process sections of the production, sodium and sulfur are distributed in these different compounds in different concentrations. In some process sections there are substantial losses of chemicals out from the process. Chemicals can also be purged from the process in a controlled manner. Depending on where in the process these losses are present, the relation between the amounts of sulfur and sodium that are lost will correspond to the relative amounts and chemical state in the process section under consideration. Such losses of chemical species involving e.g. sulfur and sodium have to be compensated by adding new chemical additives into the process. Also the balance between sodium and sulfur has to be maintained.

Even if the cost for chemical additives is considerable, the added amounts of chemical additives are generally very small compared with the total flow of chemicals used in the process. The recirculation process is therefore of crucial importance for the entire production. The process of recovering and recirculating e.g. sodium and sulfur containing chemical species is generally a complex and time-consuming process. It may e.g. comprise a number of chemical reaction steps, combustion as well as refinery and distillation processes. This means that there are relatively large amounts of sulfur and sodium present in such parts of the total process that is not immediately involved in the pulp and paper processing. However, since these chemicals are going to be recirculated, the operation of the entire process is anyway strongly influenced by the recirculation process steps. Furthermore, the recirculation of chemicals induces very large time constants for concentration variations of chemicals throughout the entire process.

The large time constants for chemical additives in the process and dead-times introduced by large volumes in the process result in that a change in chemical concentration at one place in the process will show up in other places in the process even several hours later. Most prior art systems apply control mechanisms that are based on present operational state for controlling e.g. provision of chemical additives. This may, however, instead induce substantial additional variations in chemical concentrations in the pulping process. For instance, the composition of the white liquor that is the active digester liquor, e.g. the sulfidity, can vary substantially and may furthermore be difficult to keep constant and to control to a requested value by prior-art methods. A large variation in e.g. sulfidity is typically connected to unnecessarily high consumption of chemicals and increases thereby the costs for chemical additives. This may also give rise to other disturbances eventually affecting the production quantity and/or quality.

The present invention provides an eminent possibility to operate or control the balance of chemicals throughout the entire system in a dynamic manner. Composition variations are thereby reduced, which shows mainly as a reduced cost for chemical additives. Also, a more even product quality is likely to achieve. It may therefore be important to control the process on the total balance of chemical additives present in the process, the distribution of different chemicals between and/or concentrations of different chemicals within the different process sections, as well as on the total amount of chemicals consumed by the process. The above presented dynamic model allows for a dynamic description of each individual process section as well as for a dynamic description of the distribution of e.g. sodium and sulfur through e.g. the buffer tanks. Such a model can therefore be used also to predict future sodium and sulfur distributions. The present invention is especially well-suited for controlling a pulp and paper production process and in particular the chemical balance within such a process. The present invention is also especially well-suited to be used for providing an operator of a pulp and/or paper production process advice and/or decision support. The method and the system according to the invention may however be used to carry out any of the operations of: monitoring, controlling, regulating, simulating, optimising, providing support for decisions, advising.

A production process is as mentioned further above characterized by a multitude of state variables or in particular process output variables. In e.g. a pulp and paper production process, there are a lot of quantities to measure. First of all, flows of material between different process sections and buffers are of particular interest, since they normally constitute either manipulated variables or process output variables of the process sections. The flow rate is therefore of importance, but also the composition, in particular concentrations of different chemical species, of the material flow. In a pulp and paper process, typical flow-related state variables are total volume (or flow rate), ratio of suspended solids, ratio of dissolved solids, sodium concentration, hydroxide concentration, hydrosulfide concentration, sulfate concentration, carbonate concentration and total amount reduced sulfur. Most of these variables are measurable variables that can be measured on-line, or alternatively, samples can be extracted and analyzed off-line.

In the intermediate storage, the level can be monitored and if requested also the composition of the material within the tank, and then in particular concentrations of different chemical species.

Since the processes in the process sections normally are dependent also on a number of external operational factors, such as temperature, pressure, supplied power, etc. such state variables may also be useful to measure.

Some of the measured state variables are also of interest for control purposes, i.e. they constitute controlled process output variables. As mentioned above, general process consideration such as bottlenecks or failure risk may put some restrictions on some of the process output variables. Quality consideration may call for a more careful control of other process output variables, such as white liquor concentration, discussed above. Controlled process output variables, such as extracted quantities of derivatives of chemical additives, may also be useful for the control procedure in order to be able to monitor the flow of chemicals and try to reduce the consumption thereof. In each process system, a number of controlled process output variables that are useful for monitoring important aspects of the process are thus selected and goal functions are formulated. Associated process output variables may be of great importance as input parameters into the dynamic process model, but are of less importance for the direct control action.

Manipulated variables of the different process sections are used for controlling the entire process. These manipulated variables do not have to be directly connected to the controlled process output variables, but in a general case there are more or less complex relations between the manipulated variable values and the effects thereof on the controlled process output variables. Typical manipulated variables of the processes are input flow rates, temperature, pressure, supplied power, duration of different process steps etc.

One important aspect of controlling a process by use of the present invention is connected with prediction of future process operation. Many production lines today are designed to be able to produce different amounts, types or qualities of products. There is a general trend to increase the abilities to modify the production according to the present status of e.g. sales. If a certain quality of pulp or paper is particularly requested during a certain period, the production could be turned over to produce more of that pulp or paper quality. In case the demands for paper are reduced, the production could be turned to only pulp production, which may be easier to sell or to store for future use. Production changes are common today and the trend is that the duration of each production mode is reduced more and more, and also that changes of production modes have become even more flexible according to production on customer demand.

Other changes of the production mode can be caused e.g. by planned changes in e.g. raw material properties. In a pulp and paper production system, a change between hardwood and softwood may call for different operational modes.

The same type of control situation may arise at planned maintenance work of the plant. If certain parts need maintenance, the production may be modified in such a way that the maintenance can be performed without shutting down the entire mill. This may be performed by either changing the production as a whole or by preparing the system in advance by building up sufficient buffers.

If a sudden change of operational mode is carried out and the control of the process is based substantially only on the present state, this will typically induce fluctuations in process output variables. In order to bring controlled process output variables closer to requested goal values, changes in other process output variables will appear at other places in the system, at later occasions. This behavior is generally unwanted, since it typically results in e.g. higher consumption of chemical additives. Another approach could be to gradually change operational mode, but this will in a typical case give an end product that also gradually changes its properties between the initial and final operational modes. Also, unintentional transient disturbances such as pump failure etc. may occur quite frequently in a production process system.

By using methods and systems according to the present invention, the control of a process is not only dependent on present values of state variables, but also on previous values of state variables as well as predicted future values of state variables. Future known events can then be prepared for and operation optimization can be performed also taking such changes into account. By letting some state variables on purpose drift away from their ideal values, in order to prepare for a smooth transformation into the new operational mode, an overall production advantage can be achieved. Some illustrative examples are shown further below.

The dynamic process model can in a mathematical sense be expressed as a differential algebraic equation system:

$$F[x(t),\dot{x}(t),u(t),t]=0$$

where x denotes state variables and u manipulated or estimations of measurable and derivable process output variables can be expressed as:

$$y(t)=g(x(t),t)$$

The model is also associated with model constraints, e.g. limits for different manipulated variables and/or process output variables:

$$a \leq u_k \leq b$$

$$d \leq x_k \leq e$$

There might also be different more or less complex inequality constraints:

$$c^k(x_k,u_k) \leq 0.$$

By using the dynamic model with measured present and preferably also previous process output variables as parameters, a present or "initial" state of the process can be estimated. Starting from e.g. the production plan and taking a number of additional constraints and objectives into account, target trajectories for the selected controlled process output variables can be formulated. Such optimizing aspects could concern e.g. bottlenecks, frequent failing objects and other directly production related aspects. In a pulp and paper plant, optimizing aspects connected to chemical additives are particularly important. Target trajectories for certain concentrations or flows of chemical additives are then of interest. The target trajectories are in a general case time dependent, i.e. functions of time. The target trajectories take constraints imposed by optimizing aspects into account, e.g. the allowed range for different process output variables could be restricted.

The control method according to the present invention performs an optimization procedure, in which optimum input trajectories of the manipulated variables are created. The optimization is performed minimizing an objective function. The objective function is formulated in accordance with the optimizing aspects and is preferably based on a comparison between the target trajectories of the controlled process output variables and controlled process output variables as predicted by the dynamic process model. The computation is based on present values of state variables. The objective function is minimized by varying the input trajectories for the manipulated variables. The input trajectories giving the minimum of the objective function is thereby stated to be the optimum input trajectories.

The goal for the entire process is then to operate the process in such a way that the controlled process output variables are kept as close as possible to respective target trajectory, with acceptable efforts and with pre-determined weights for competing targets. The production plan is typically included as one of the targets.

A process system, such as a pulp and paper plant is usually such a complex system that an optimization performed directly against ideal target trajectories for the controlled process output variables often becomes relatively unstable. The model details and the computational efforts needed for a stable optimization are often not realistic in practice. This becomes more critical upon rapid changes in the operational mode of the system, both planned and unplanned changes. A useful approach to overcome these problems is to use reference trajectories as target trajectories in the optimization process. The reference trajectories are modified, typically smoothened, ideal set-point trajectories, taking the initial state and future planned operational mode changes into account. An illustrative example will be given here below.

Figure 3:
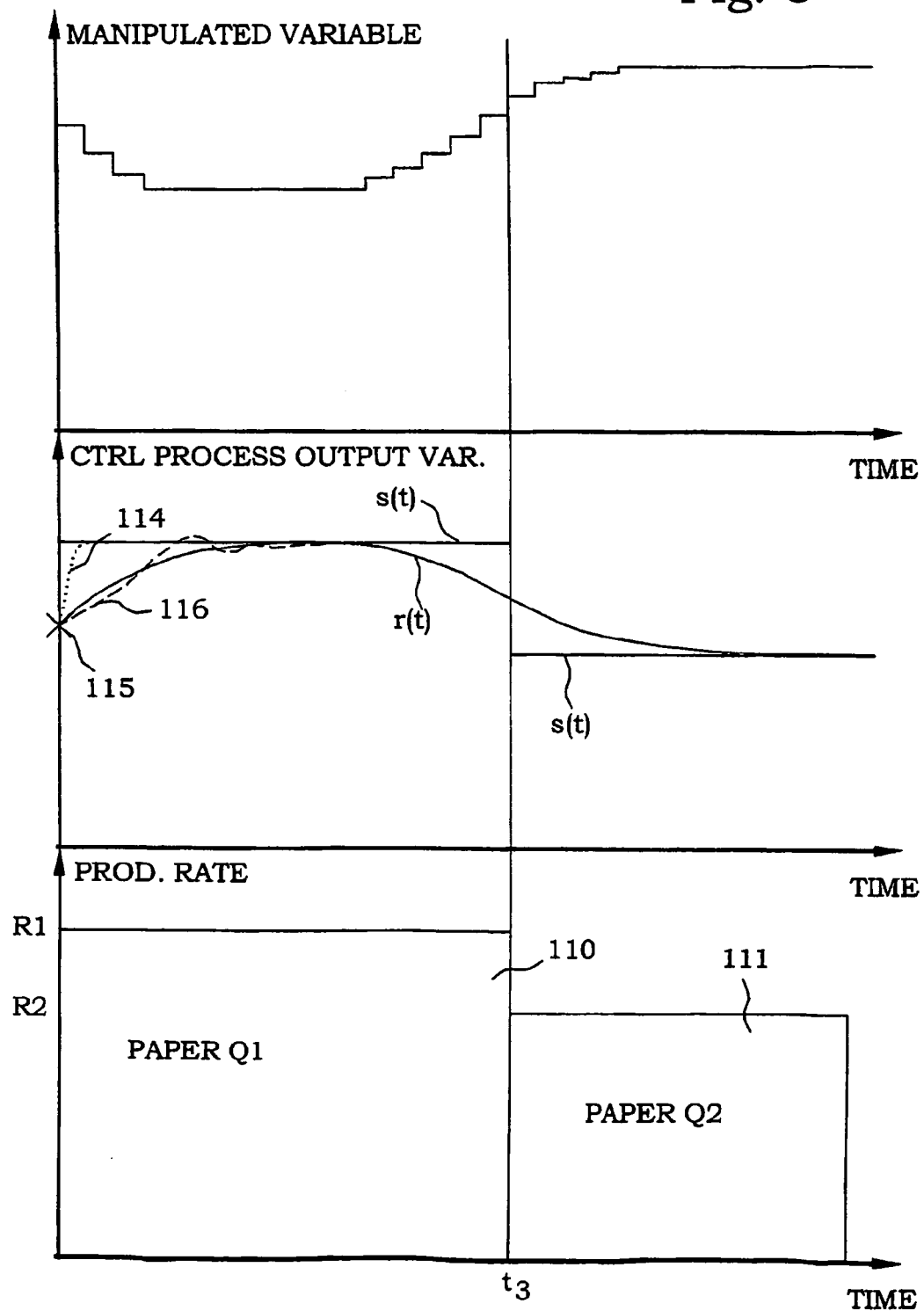
FIG. 3 is a diagram illustrating production plans, state variable trajectories and input trajectories created by a method according to the present invention.

In FIG. 3, a production plan 110, 11 and its influence on the process operation are illustrated. At the bottom, the production plan is illustrated. Until a time $t_3$, paper of a certain paper quality Q1 should be produced at a predetermined rate R1. After time $t_3$, the production is planned to change to a paper quality Q2 with a production rate of R2. In the middle part of FIG. 3, an ideal set-point trajectory s(t) for a controlled process output variable is illustrated. The controlled process output variable is measured, either directly or indirectly. Preferably, as discussed more in detail further below, the measured controlled process output variable is treated in a state estimation process. The estimated present value of the process output variable is illustrated as a cross 115, in general somewhat offset from the ideal set-point trajectory. In a control process allowing all parameters to vary in any combination it would be natural to request that the actual controlled process output variable should reach the ideal set-point trajectory as fast as possible, i.e. e.g. according to the dotted curve 114. However, fast changes in control variables induce fluctuations in the process conditions, and the actual processes may put physical limitations on the rapidness of response to control actions. Furthermore, competing optimization considerations may also deteriorate the stability of the control process.

A better way in a typical practical case would be to control the controlled process output variable in a smoother manner. A reference trajectory r(t) is instead created, being a modification of the ideal set-point trajectory with a smoothened behavior. In the first part, e.g. an exponentially decreasing difference between the ideal set-point trajectory s(t) and the reference trajectory r(t) is assigned. Closer to $t_3$, where the ideal set-point trajectory s(t) exhibits a step, the reference trajectory r(t) will deviate exponentially to reach the mean value at the step time and then again smoothly approaching the ideal set-point trajectory s(t). In this example, an exponential form was selected, but anyone skilled in the art realizes that any suitable smooth curve shape can be used for such purposes. The reference trajectory r(t) will then be used as the target trajectory for the optimization process. The actual trajectory may look like curve 116.

When performing the optimization, the reference trajectories of several controlled process output variables are used and a weighting between different optimizing aspects is performed. One optimized input trajectory for manipulated variable relatively closely related to the process output variable of FIG. 3, is illustrated in the top part of FIG. 3. It is here seen that the control action caused by the changing process mode at t3 starts in advance and forms a smooth translation.

The target trajectories of different controlled process output variables are in a general case not entirely compatible with each other. In a typical case, there has to be some trade-off between the different controlled process output variables. This is made by formulating the objective function in a proper manner. A difference between the actual value of a controlled process output variable and the corresponding target trajectory is often used and can be weighted, as a compromise between different competing targets.

A general optimization problem can be expressed in a discrete formulation with a sampling time of $\Delta T$, as:

$$\min_{u^k, k=\hat{k},\ldots,\hat{k}+K-1} J$$

where J is the objective function, considering constraints imposed by the model and/or production plan, $t=k\Delta T$, and K is the number of samples in prediction horizon, $\hat{k}$ is the latest sample point and $u^k$ is a manipulated variable. In a typical pulp and paper case the objective function could be composed by several competing aspects:

$$J = J_{fiber\ need} + J_{conc} + J_{chem} + J_{prod\ loss}.$$

An example of one of the terms could e.g. be:

$$J_{conc} = \sum_{k=\hat{k}}^{\hat{k}+K} q_{conc}(x_k - x_{ref\ k})^2,$$

where q is a weight factor for different chemical species. A concentration term as the one above thus favors a stable concentration. The objective function involves a kind of time integration, considering the J values at all sampling events k. A time factor may also be implemented in the objective function, e.g. to weight the near future differently from the far future:

$$J_{conc} = \sum_{k=\hat{k}}^{\hat{k}+K} w(k-\hat{k}) q_{conc}(x_k - x_{ref\ k})^2.$$

Terms of near future can then be assigned a larger weight than more time distant terms.

Terms involving a total amount of a chemical species in one or several process sections favors a reduction of this species in these process secions. When aiming for reducing a total amount for the entire process, at least two process sections are preferably involved.

For e.g. bottleneck problems, terms involving buffer capacity and/or buffer levels before and after the bottleneck process sections are used. One useful term is dependent on remaining buffer capacity of a buffer preceding a bottleneck process section. Another useful term is dependent on the actual buffer level of a buffer following a bottleneck process section.

For process section having a relative high probability of failure, the terms are preferably defined in the opposite manner. One useful term is dependent on remaining buffer capacity of a buffer following the process section in question, while another useful term is dependent on the actual buffer level of a buffer preceding the process section.

For solving the optimization problem for a complex process, some kind of solver has to be used. The more complex the system is, the more computational capacity is needed. There are several solvers of optimization problems available today. The proper choice has to be determined in relation to the actual system that is going to be controlled.

However, the actual procedure of performing the computation of the optimization takes place according to known principles and is not particularly important for the basic invention idea, and the details are therefore left out from this description.

Thus, by letting the objective function depend on not only the present situation, but also on predicted future situations, the overall operation can be improved. This is particularly important for process features having fluctuations with large time constants. The best example of such process features known to us is the total amount of and the distribution of chemical additives through a pulp and paper production process.

A complex process, such as pulp and paper production, gives rise to a quite complicated optimization problem. A large number of variables are to be optimized according to relations and constraints, and the choice of solver should be performed considering also this. Although the processor capacities of today are quite impressive, the time required to perform the actual calculations may take several minutes. However, since the typical time constants for changes within pulp and paper systems are long, a total time for measuring, state estimation and optimization of several minutes may still be short enough to perform an actual on-line control of the process. The sampling time $\Delta T$, mentioned above, may in a typical case be e.g. less than 15 minutes.

Even if the present invention today is believed to be applicable more or less only to slowly reacting processes, increased computational speed may change these preferred areas of applications. Faster optimizations opens up the use of the method also for faster responding systems.

The output of the optimizing procedure is as described above a set of input trajectories for the manipulated variables of the process, i.e. recommended settings to an operator as a function of time. The process can thereby be operated or controlled manually, by setting the manipulated variables of the process manually according to the suggested input trajectories. An operator may then include his experience to avoid operational mistakes. True on-line operation or control can also be accomplished, where the control variables automatically are set to the input trajectory values.

In FIG. 3, the input trajectory is a piecewise constant function of time, i.e. the manipulated variables are adjusted intermittently. Such an extra constraint on the manipulated variables is in agreement with the discretized formulation of the optimization and can be put in order to facilitate e.g. manual control, since it is difficult for an operator to continuously change a larger number of manipulated variable settings. However, if an automatic control is applied, the manipulated variable settings and hence the input trajectories may be continuously changing.

The production plan and state variable trajectories are calculated for a certain time interval, in the present disclosure called prediction time interval $\Delta t_1$. The prediction time interval should preferably be selected to be longer than the time constants of any monitoring state variable variation. In a typical pulp and/or paper process, the prediction time interval can with advantage be 12 hours or even longer. Any variations in process output variables that are in progress will then be considered in the calculation processes. However, the accuracy of the prediction will decrease with increased prediction time interval length. The end of the trajectories will therefore not be as accurate as the first parts thereof.

Figure 4:
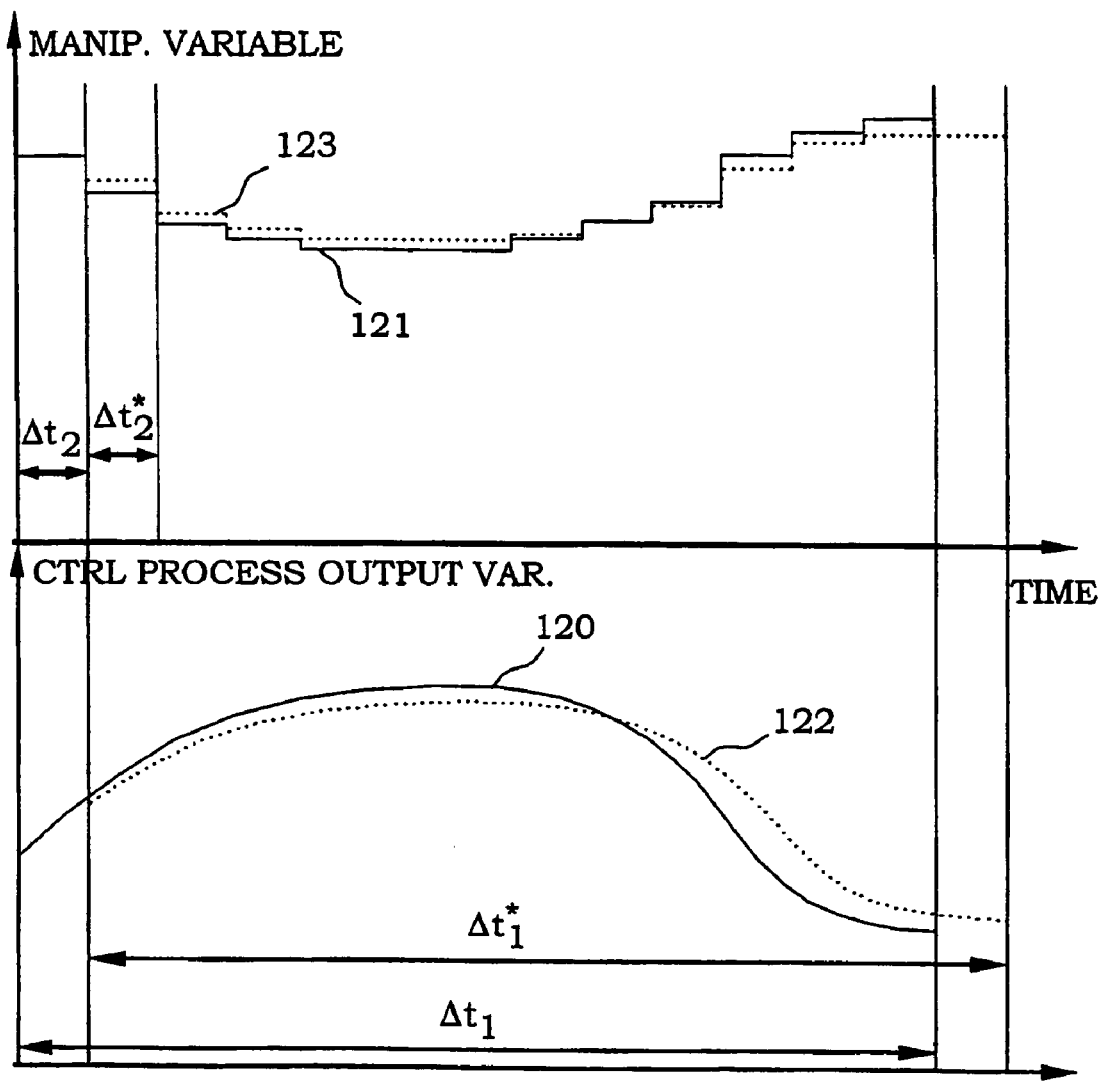
FIG. 4 is a diagram illustrating a principle of receding horizon usable with the present invention.

Moreover, the input trajectories suggested for control purposes suffer the same accuracy declination as the predictions from the model. This means that the first part of the input trajectories is rather accurate, while the end part of the trajectories are impaired with large uncertainties. It is therefore not suitable to use the entire input trajectory at once. A practical solution on this problem is to use a "receding horizon" approach. The principles are illustrated in FIG. 4. With this approach, the entire optimization is performed over the prediction time interval $\Delta t_1$, represented by a controlled process output variable reference trajectory 120. However, only a first small portion of the input trajectories 121 (of which one is illustrated in the figure) is used for control purposes. This time portion is in the present disclosure called the control time interval $\Delta t_2$. The control time interval is preferably substantially shorter than the prediction time interval and may e.g. be equal to the sampling time mentioned earlier. Typically, the control time interval is more than ten times shorter than the prediction time interval. When the end of the control time interval $\Delta t_2$ approaches, new measurements, new predictions and a new optimization is performed with the new prediction time interval $\Delta t_1^*$ moved forward to begin substantially at the end of the previous control time interval. A new optimisation is performed, resulting in new state variable trajectories 122 and new input trajectories 123. The control operation can hence be performed during the new control time interval $\Delta t_2^*$. The procedure can continue by successively move the prediction time interval and the control time interval forward. In this way, the accuracy is guaranteed at the same time as an optimum time dependence of the optimization horizon is ensured. Furthermore, a previous input trajectory is believed to form a very advantageous start approximation for the following optimization.

Due to the finite computational speed, there is typically a certain time difference between the actual measuring time and the start of the corresponding control time interval. However, such time differences are compensated for in the model and optimization routines.

In the optimization procedure, the start point or the initial state of the process is used. This initial state is estimated by using the model and present and preferably also previous measurements of different quantities associated with process output variables. Since both the model and the measurements suffer from noise and uncertainties, a preferred embodiment of the present invention employs some kind of state estimation procedure. When taking noise into account, the dynamic process model may be represented as:

$$x_{k+1} = f(x_k, u_k) + w_k,$$

where $w_k$ represents model noise. Similarly, observations may be expressed as:

$$y_k = g(x_k) + v_k,$$

where $v_k$ represents measurement noise. A state estimation process may then be expressed as:

$$\min_{x_0, k=0,\ldots,\hat{k}-1} \sum_{k=0}^{T-1} \|v_k\|^2 R^{-1} + \|w_k\|^2 Q^{-1},$$

where R and Q are the covariance matrix of measurement deviation uncertainty and uncertainty of the model, respectively, giving a weighting between the uncertainty of measurements and model, respectively. In this manner an estimated initial state is obtained, which ideally depends on the present measurements as well as on previous measurements.

Figure 6:
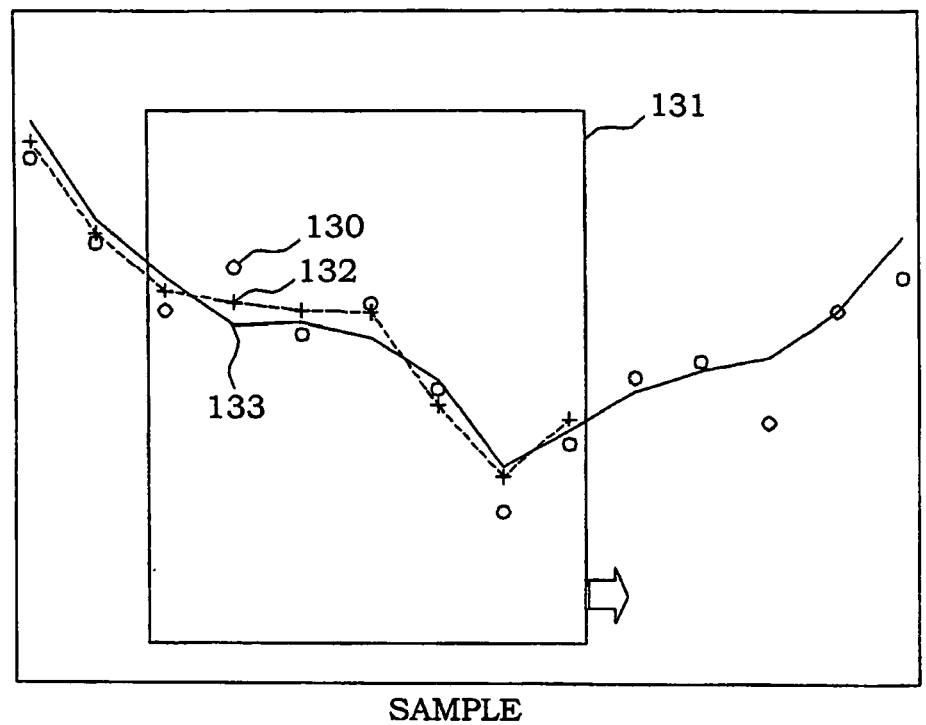
FIG. 6 is a diagram illustrating a state estimation process.

An approach to implement state estimation is to use a moving horizon estimation. This is schematically illustrated in FIG. 6. A diagram illustrates a series of measurements 130 of a process output variable at different sampling times. A frame 131 defines a certain number of previous measurements, which are going to be used in the state estimation process. The previous measurements are put into the dynamic process model and minimized regarding the measurement noise and the model uncertainty. From the optimization using measurements from the entire frame 131, an estimated value 132 based on the present measured value is provided, which is believed to resemble the actual value 133 in a better manner. The estimation is thus performed using the dynamic process model in a historical perspective. The following optimization of the control procedure uses the same fundamental dynamic process model in a future perspective instead.

The actual state estimation can also be performed using other techniques, e.g. Kalman filter techniques. Different state estimations may be optimal for different process systems, depending on the actual design of the process model.

Figure 5:
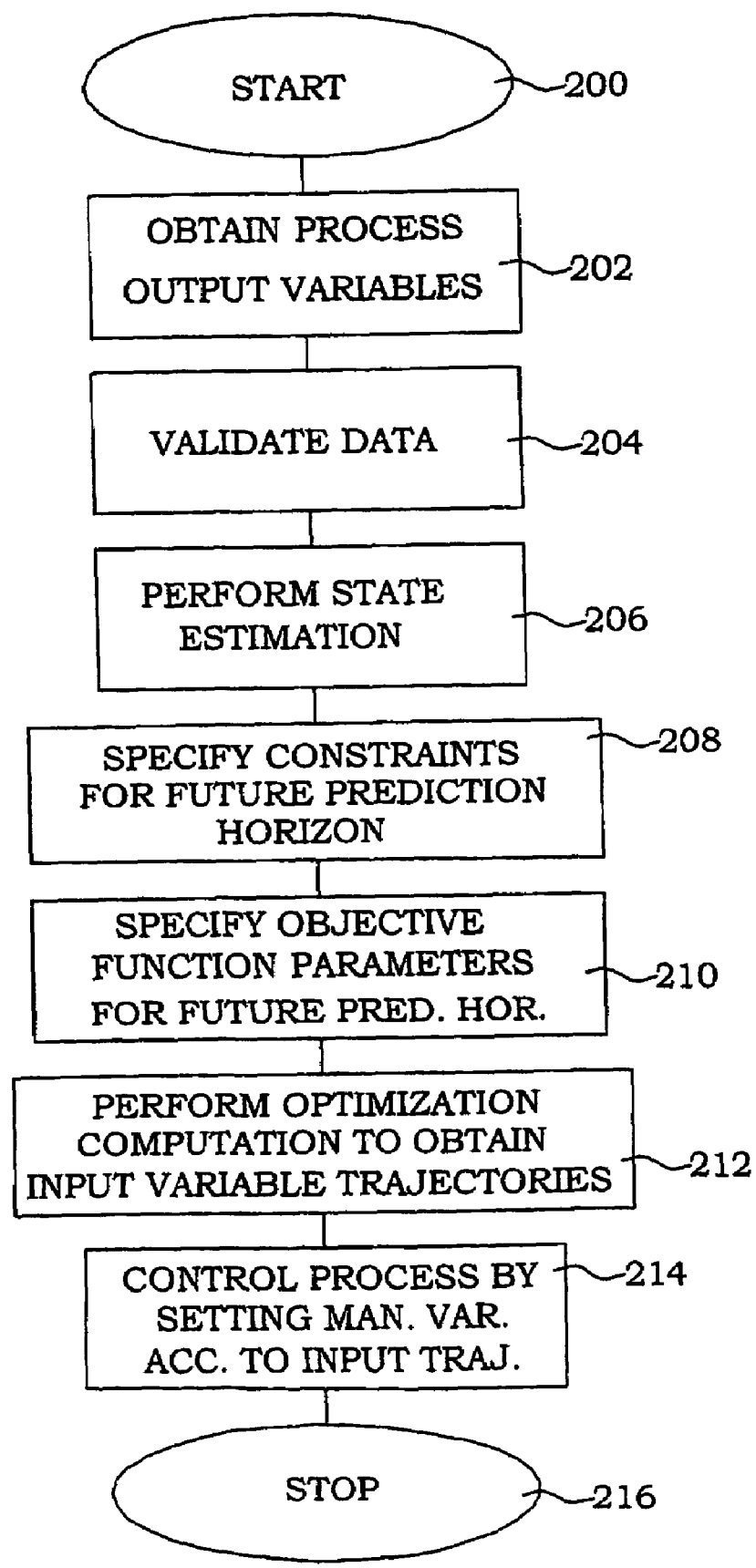
FIG. 5 is a flow diagram of an embodiment of a method according to the present invention.

As a summary, an embodiment of a general method according to the present invention is illustrated in a flow diagram in FIG. 5. The process starts in step 200. In step 202, process output variables are obtained. In step 204, this data is validated and in step 206 a state estimation is performed in order to determine an initial state. Constraints for a future prediction horizon $\Delta t_1$ are specified in step 208. Preferably a production plan for the prediction horizon interval is provided. In step 210, objective function parameters are specified for the future prediction horizon. This objective function depends on predicted controlled process output variables. Preferably, the method is applied on pulp and paper production, where at least one controlled process output variable is associated with the amount, distribution and/or consumption of chemical additives. In step 212, input trajectories for manipulated variables for the prediction time interval are created by an optimization process. The input trajectories correspond to those manipulated variables that optimize the objective function, under the constraints. Finally, the process is controlled in step 214 by setting the manipulated variables according to the input trajectories during a control time interval $\Delta t_2$. The process ends in step 216. Preferably, the steps of the present flow diagram are repeated. The state estimation step 206, and the optimization computation 212 are performed using a dynamic process model. The dynamic process model has time dependent relations between manipulated variables of process sections of the process and process output variables of the same process section.

The methods according to the present invention may be implemented as software, hardware, or a combination thereof. A computer program product implementing the method or a part thereof comprises software or a computer program run on a general purpose or specially adapted computer, processor or microprocessor. The software includes computer program code elements or software code portions that make the computer perform the method using (at least one of the steps previously described in FIG. 5. The program may be stored in whole or part, on, or in, one or more suitable computer readable media or data storage means such as a magnetic disk, CD-ROM or DVD disk, hard disk, magneto-optical memory storage means, in RAM or volatile memory, in ROM or flash memory, as firmware, or on a data server. Such a computer program product can also be supplied via a network, such as Internet.

Figure 7:
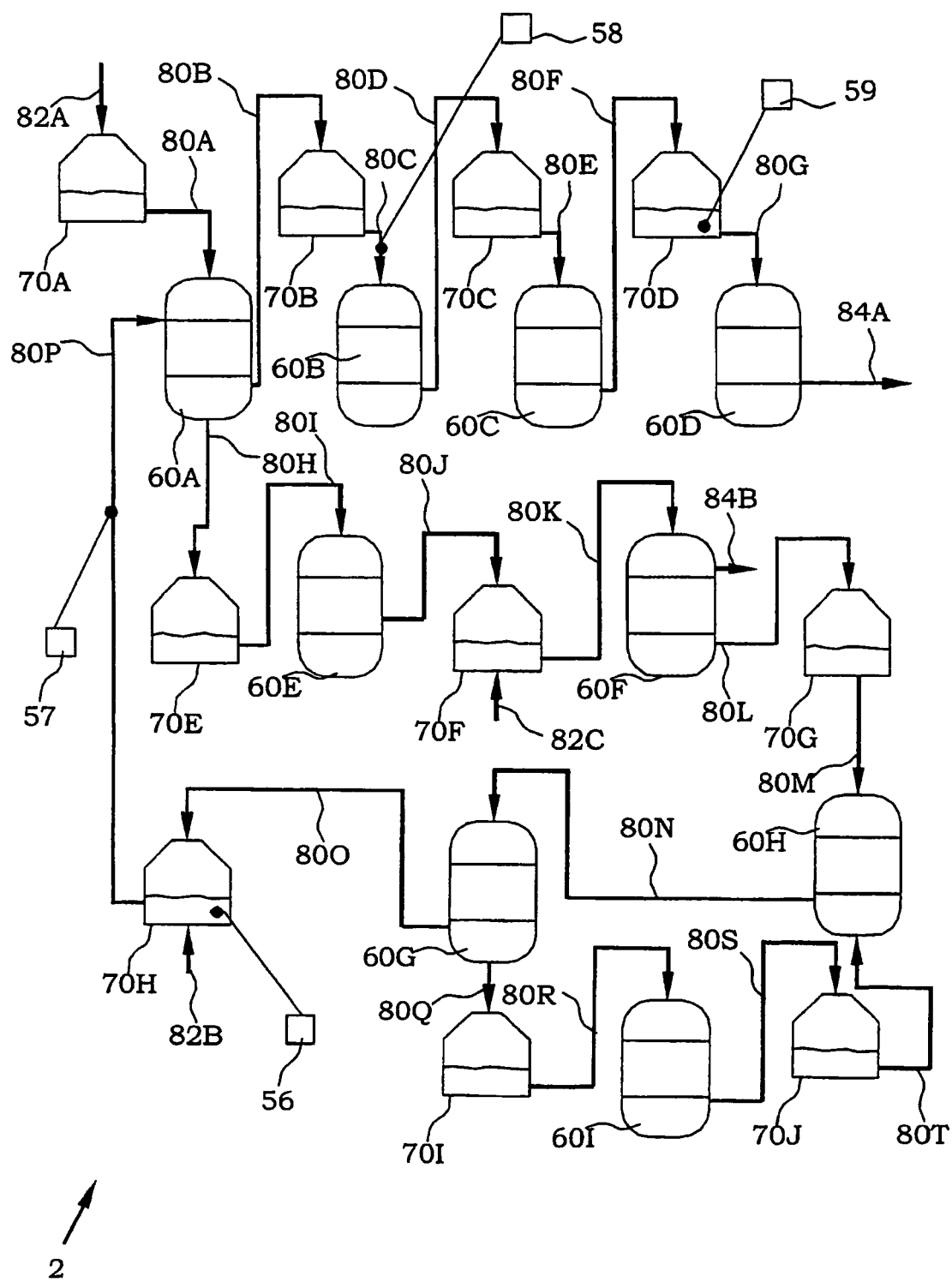
FIG. 7 is a block diagram illustrating a pulp and paper production system according to an embodiment of the present invention.

In FIG. 7, an embodiment of a pulp and paper process system 2 according to the present invention is illustrated schematically. The illustrated process system 2 is based on the sulfate process principle. In the sulfate process, an initial input flow consists of wood chips 82A. A flow of wood chips 80A enters a digester 60A, where the chips are cooked at approximately 170° C. with a liquor, called white liquor 80P, containing OH— and HS— ions as active species. Lignin is then separated from the carbohydrates, cellulose and hemicellulose in the fibers. The cooking can be done in either a continuous or a batch process. After the cooking, the pulp is washed (not shown in the figure) and provided as a flow 80B. Pulp 80C is further delignified in an oxygen delignification stage 60B. After oxygen delignification, pulp 80D, 80E is transported to a bleach plant 60C. Bleached pulp 80F, 80G is supplied to a paper machine 60D for the actual papermaking process step. Paper 84A leaves the plant as the output product.

Liquor spent from the cooking 60A containing the cooling chemicals and the dissolved organic substance is called weak black liquor 80H. The black liquor 80I is brought to and evaporated in the evaporation plant 60E from a dry solid content from below 20% to 65–80% dry solid content. The evaporated black liquor is provided to a recovery boiler 60F, where it is combusted. In the combustion, the energy of the organic substance is recovered in the form of high-pressure steam. The inorganic substance is separated as a smelt at the bottom of the boiler. The sulfur compounds are here reduced to sulfide ($S^{2-}$). The smelt consists mainly of sodium carbonate and sodium sulfide. The smelt is dissolved in water and the resulting liquor 80L is called green liquor. The sulfide is hydrolyzed to $OH^-$ and $HS^-$ when it is brought into contact with the water. The green liquor 80M is provided to a recausticizing department 60H. Here, the carbonate is transformed to $OH^-$— ions by the reaction with $Ca(OH)_2$. The solid calcium carbonate that is used is burned to CaO in a lime kiln 60I and thereafter slaked to give $Ca(OH)_2$ represented by 80S, which is entered via 80T into the recausticizing department 60H. The slurry 80N is filtrated in filter 60G to give white liquor 80O, the rest 80Q is returned as an input 80R to the lime kiln 60I. Finally, the white liquor 80P is returned to the digester 60A. Make-up chemicals are added, such as NaOH in 82B and $Na_2SO_4$ in 82C to replace losses and to adjust sodium and sulfur imbalances.

The sodium and sulfur balance is adjusted by purging ESP-dust 84B (Electro-Static Static Precipitator) from the recovery boiler 60F. ESP-dust 84B consists mainly of $Na_2SO_4$ and some $Na_2CO_3$. The balance between sodium and sulfur is defined by the sulfidity of the white liquor. If the sulfidity is above the set point, sulfur has to be purged by ESP-dust. Since the ESP-dust also contains sodium, sodium will be lost. This loss has to be covered with NaOH make-up. If the sulfidity is below the target, sulfur has to be added to the process (for example as $Na_2SO_4$ in 82C).

Several buffer tanks are needed in the process. Wood chips are stored in 70A.

Pulp of different quality is stored in 70B-D. Weak black liquor is stored in 70E, prior to evaporation. Strong black liquor 80J with a high dry-solid C content is stored in 70F. Tank 70G contains green liquor and 70H contains white liquor. In tank 70I, lime mud (mainly $CaCO_3$) is stored prior to reburning and the burned lime (mainly CaO) is stored in 70J before slaking/recausticizing.

Several process output variables are measured e.g. effective alkali (EA), degree of caustization and sulfidity represented by 56. This can be done either with on-line sensors or at the process laboratory. Flow rates, represented by 57, consistencies represented by 58 and buffer tank levels represented by 59 are also measured at several positions.

In a preferred control method for the system illustrated in FIG. 7, a number of optimizing aspects are used. One goal for the opt ization according to the present invention is to minimize the discrepancy of certain concentrations of chemical species with regard to recommended set-point values. In particular the sulfidity of the white liquor 80P provided to the digester 60A is important to control to keep the sulfidity of the digester 60A as constant as possible close to a desired level. It is thus preferred to select the sulfidity in the digester 60A as one of the controlled process output variables. It is also desirable to keep the total cost for chemicals down, and therefore the additions 82B and 82C should be kept as low as possible, as well as the outlet ESP-dust flow 84B. This means that the flows 82B, 82C and 84B also should be selected as controlled process output variables. In a preferred operational mode, there are certain relations between amount and concentration of certain chemical species in different parts of the process. Since the concentration of sulfur in form of different chemical compounds in the different liquors is of importance, concentrations of different chemical species in the flows 80H–T are interesting to be used as controlled process output variables as well.

Furthermore, the optimization to minimize production losses at minor production disturbances and to minimize the effects of bottleneck processes are typically based on controlled process output variables in the form of buffer levels of buffer tanks before and after identified problem sections.

Optimizing criteria, such as keeping the production rate according to the production plan, to minimize the variations in fiber need at the paper machine 60D etc. are also included as terms in the objective function.

Figure 8:
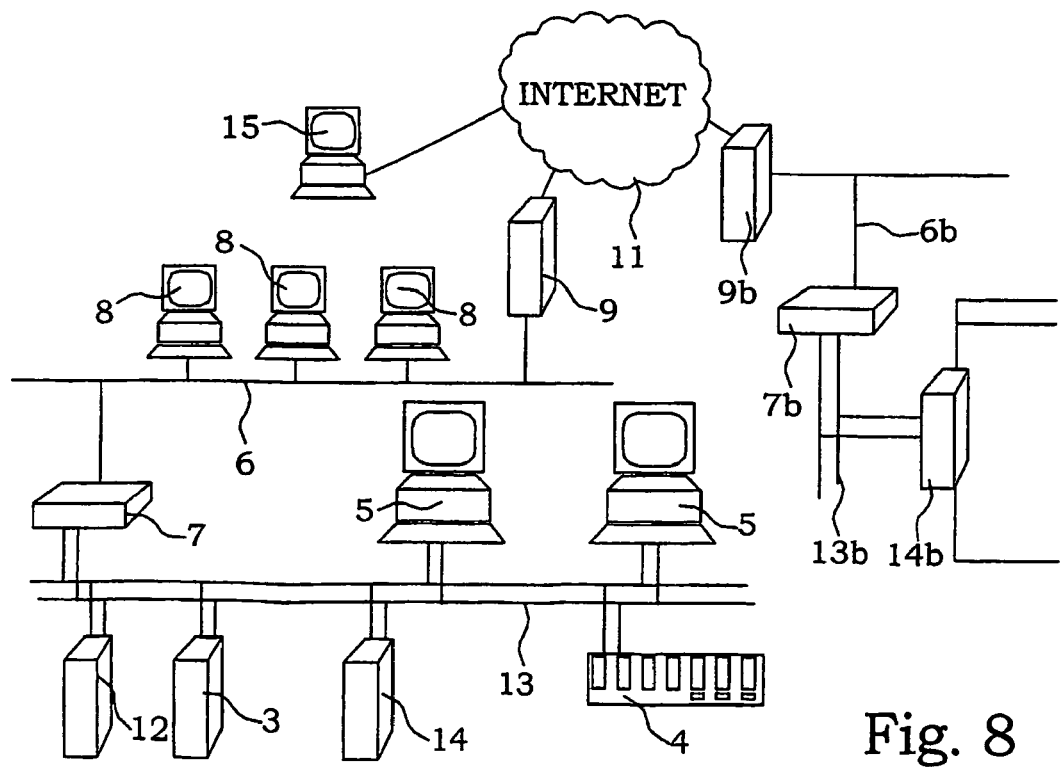
FIG. 8 is block diagram of a computer system useful in a system according to the present invention.

The described method is preferably implemented, as illustrated in FIG. 8 by a suitable network topology, in a separate server connected to an internal mill computer network 13. The network will typically be connected to a domain server 12. A server 14 where the method is implemented will typically also include functionality to exchange data with the process control system and other servers 15 containing relevant data as e.g. process history data storage systems, laboratory data storage systems 3 etc. A preferable way to exchange data is via OPC (Object Linking and Embedding for Process Control) 4. OPC is a specification requiring all data sources to show the same type of interface. OPC is a well-known specification published by the OPC foundation. It is based on Microsoft's Component Object Model (COM).

The server 14 could e.g. use the Aspect Integration Platform (AIP-server) as the communication layer between the described method and the mill information. This approach makes it possible to access the server 14 via separate workplaces 5, which in case of the Aspect Integration Platform is used could be clients including Operate IT. The internal mill computer network is often connected to an intranet 6 via a router 7. This makes it possible to access the described method via workplaces with thin clients 8, using Internet Explorer. Via a firewall 9, the described method could also be accessed via computers connected to the Internet 11. A system with Internet connection does as an alternative also allow for the method to be implemented in a server at a remote location. The service provider at this remote location will then have a similar network topology as the mill network, as indicated in FIG. 8 (13b, 14b, 6b, 7b and 9b). The server 14 at the mill network 13 is in this case not needed. The described method will in this case be installed in an equivalent server (14b) at the remote network. This remote location may be at a service provider's office. From this remote location several client mills may simultaneously be optimised and controlled in real time by using the described method.

The present invention is described by examples from pulp and paper industry, and in particular connected to optimization of the use of chemical additives. These examples are especially well suited for applying the present invention. However, also other optimization considerations may be used with the present invention. The invention can also be applied to other process production systems with process sections and/or intermediate storages in, (for example the chemical industry, the petrochemical industry (refineries etc.), pharmaceutical and food industry, consumer industry and metal and minerals industry.

It will be understood by those skilled in the art that various modifications and changes may be made to the present invention without departure from the scope thereof, which is defined by the appended claims.

REFERENCES

European Patent Application EP 1 035 253

The invention claimed is:

1. A method for a production process having a number of process sections the method comprising:
    obtaining a dynamic process model having time dependent relations between manipulated variables for said process sections and process output variables from respective process section;
    providing external constraints for said production process for a prediction time interval;
    measuring a set of process output variables of said production process;
    estimating an initial state by using said measured process output variables;
    defining an objective function involving predicted controlled process output variables for said prediction time interval and said external constraints;
    said predicted controlled process output variables being defined by said dynamic process model based on said initial state;
    optimizing said objective function under constraints imposed by said dynamic process model and/or said external constraints, by adapting said manipulated variables, giving input trajectories for said manipulated variables for said prediction time interval; and
    operating said production process by setting said manipulated variables according to said input trajectories during a control time interval.

2. The method according to claim 1, wherein said method is a pulp and/or paper production method.

3. The method according to claim 2, wherein said controlled process output variables comprise at least one variable associated with chemical additives used for pulp and/or paper production.

4. The method according to claim 3, wherein said defining step in turn comprises the step of including an objective function term being dependent on a total amount of chemical additives in at least two of said process sections.

5. The method according to claim 3, wherein said defining step in turn comprises the step of including an objective function term being dependent on the relative distribution of different chemical forms of chemical additives between different process sections throughout the production process.

6. The method according to claim 3, wherein said defining step in turn comprises the step of including an objective function term being dependent on a difference between a concentration of at least one chemical additive in at least one of said process sections and a pre-determined set value.

7. The method according to claim 6, wherein said concentration is related to sulfidity.

8. The method according to claim 1, wherein said external constraints comprises a production plan.

9. The method according to claim 1, wherein said estimation of said initial state is also obtained by previously measured process output variables.

10. The method according to claim 9, wherein said estimation of said initial state comprises a state estimation procedure.

11. The method according to claim 10, wherein said state estimation procedure is a moving horizon state estimation.

12. The method according to claim 1, wherein said control time interval is a part of said prediction time interval.

13. The method according to claim 12, wherein said control time interval is substantially shorter than said prediction time interval.

14. The method according to claim 13, wherein said prediction time interval is more than 10 times longer than said control time interval.

15. The method according to claim 1 wherein at least a part of said measuring of process output variables is performed on-line.

16. The method according to claim 1 wherein at least one of said process output variables is selected from the list of:
   flow rate;
   flow concentration;
   buffer level;
   buffer concentration; and
   internal process section variable.

17. The method according to claim 1 wherein said defining step in turn comprises the step of:
   deriving target trajectories for said controlled process output variables under said external constraints starting from said initial state;
   whereby said objective function comprises deviations between said target trajectories and predicted process output variables integrated over said prediction time interval.

18. The method according to claim 17, wherein said deriving step in turn comprises the steps of:
   calculating ideal set-point trajectories for said controlled process output variables under constraints imposed by said production plan; and
   modifying said ideal set-point trajectories into said target trajectories by introducing said initial state and a smoothing with time of structures of said ideal set-point.

19. The method according to claim 17, wherein said integration over said prediction time interval further comprises a time dependent weight function.

20. The method according to claim 1 wherein said dynamic process model in turn comprises a number of section models, representing operation of a process section, connected to a number of intermediate storage models by model flows;
   said section models comprising said time dependent relations; and
   said intermediate storage models being characterized by a buffer level.

21. The method according to claim 20, wherein defining step in turn comprises the step of including an objective function term being dependent on remaining buffer capacity of a buffer preceding a bottleneck process section and on said buffer level of a buffer following a bottleneck process section.

22. The method according to claim 20, wherein defining step in turn comprises the step of including an objective function term being dependent on said buffer level of a buffer preceding a process section having a relative high probability of failure and on remaining buffer capacity of a buffer following a process section having a relative high probability of failure.

23. The method according to claim 1, wherein one or more steps of said method is performed at a location remote from said production process.

24. A production process system, comprising:
   a number of process sections, controllable by manipulated variables;
   sensors measuring a set of process output variables of said production process;
   processor means, connected to said sensors;
   process section control means, setting said manipulated variables, said process section control means being connected to said processor means;
   said processor means in turn comprising:
      means for obtaining a dynamic process model having time dependent relations between manipulated variables for said process sections and process output variables from respective process section;
      means for providing external constraints for a prediction time interval;
      means for defining an objective function involving predicted controlled process output variables for said prediction time interval and said external constraints;
      said predicted controlled process output variables being defined by said dynamic process model based on an estimation of an initial state obtained by said measured set of process output variables;
      means for optimizing said objective function under constraints imposed by said dynamic process model and/or said external constraints by adapting said manipulated variables, giving input trajectories for said manipulated variables for said prediction time interval;
   whereby said process section control means is arranged for setting said manipulated variables according to said input trajectories during a control time interval.

25. A system for a production process having a number of process sections, controllable by manipulated variables, comprising:
   processor means; and
   process section control means, setting said manipulated variables, said process section control means being connected to said processor means;
   said processor means in turn comprising:
      sensor input means for receiving a set of process output variables of said production process;
      means for obtaining a dynamic process model having time dependent relations between manipulated variables for said process sections and process output variables from respective process section;
      means for providing external constraints for a prediction time interval;
      means for defining an objective function involving predicted controlled process output variables for said prediction time interval and said external constraints;
      said predicted controlled process output variables being defined by said dynamic process model based on an estimation of an initial state obtained by said measured set of process output variables;

means for optimizing said objective function under constraints imposed by said dynamic process model and/or said external constraints by adapting said manipulated variables, giving input trajectories for said manipulated variables for said prediction time interval;

whereby said process section control means is arranged for setting said manipulated variables according to said input trajectories during a control time interval.

26. The system according to claim 25, wherein said production process system is a pulp and/or paper production process system.

27. The system according to claim 26, wherein said controlled process output variables comprise at least one variable associated with chemical additives of said production process.

28. The system according to claim 27, wherein said objective function comprises a term dependent on a total amount of chemical additives in at least two of said process sections of said production process.

29. The system according to claim 27 wherein said objective function comprises relations based on the relative distribution of different chemical species of chemical additives between different process sections throughout the production process.

30. The system according to claim 27 wherein said objective function comprises a term dependent on a difference of a concentration of at least one chemical additive in at least one of said process sections and a pre-determined set-value.

31. The system according to claim 30, wherein said concentration is related to sulfidity.

32. The system according to claim 25 wherein said external constraints comprise a production plan.

33. The system according to claim 25 wherein said estimation of said initial state is obtained also by previously measured process output variables.

34. The system according to claim 33, wherein said processor further comprises state estimation means for performing said estimation of said initial state.

35. The system according to claim 25 at least one of said process output variables of said production process system has a time constant exceeding 12 hours.

36. The system according to claim 25 said prediction time interval exceeds 12 hours.

37. The system according to claim 25 said control time interval is less than 15 minutes.

38. The system according to claim 25 wherein communication links between said processor and said production process, for allowing a remote control of said production process.

39. The system according to claim 38, wherein said communication links comprises a data communication network.

40. A computer program product comprising computer code means and/or software code portions for making a processor perform the steps of claim 1.

41. The computer program product according to claim 40 supplied via a network, such as Internet.

42. A computer readable medium containing a computer program product according to claim 40.

43. A computer program comprising computer code means and/or software code portions for making a processor perform the steps of claim 1.

44. The computer program according to claim 43 supplied via a network, such as Internet.

45. Use of a method according to claim 1 to carry out on a production process any of the operations of: monitoring, controlling, regulating, simulating, optimising, providing support for decisions, advising.

46. Use of a method according to claim 1 to carry out on a pulp and/or paper production process any of the operations of: monitoring, controlling, regulating, simulating, optimising, providing support for decisions, advising.

47. Use of a system according to claim 25 to carry out on a production process any of the operations of: monitoring, controlling, regulating, simulating, optimising, providing support for decisions, advising.

48. Use of a system according to claim 25 to carry out on a pulp and/or paper production process any of the operations of: monitoring, controlling, regulating, simulating, optimising, providing support for decisions, advising.

* * * * *